(12) United States Patent
Roundy et al.

(10) Patent No.: US 9,754,106 B2
(45) Date of Patent: Sep. 5, 2017

(54) SYSTEMS AND METHODS FOR CLASSIFYING SECURITY EVENTS AS TARGETED ATTACKS

(71) Applicant: Symantec Corporation, Mountain View, CA (US)

(72) Inventors: Kevin Alejandro Roundy, El Segundo, CA (US); Sandeep Bhatkar, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 120 days.

(21) Appl. No.: 14/513,804

(22) Filed: Oct. 14, 2014

(65) Prior Publication Data
US 2016/0103992 A1    Apr. 14, 2016

(51) Int. Cl.
*G06F 21/55* (2013.01)
*H04L 29/06* (2006.01)

(52) U.S. Cl.
CPC ............ *G06F 21/554* (2013.01); *G06F 21/55* (2013.01); *H04L 63/1416* (2013.01)

(58) Field of Classification Search
CPC .......................... G06F 21/554; H04L 63/1416
See application file for complete search history.

(56) References Cited

U.S. PATENT DOCUMENTS

| | | | | |
|---|---|---|---|---|
| 5,675,711 A | * | 10/1997 | Kephart | G06F 21/564 706/12 |
| 6,671,811 B1 | * | 12/2003 | Diep | G06F 21/552 709/223 |
| 8,122,122 B1 | * | 2/2012 | Clingenpeel | G06F 21/552 709/203 |
| 9,009,828 B1 | * | 4/2015 | Ramsey | H04L 63/1416 726/23 |
| 2007/0079379 A1 | * | 4/2007 | Sprosts | G06Q 10/107 726/24 |
| 2007/0169194 A1 | * | 7/2007 | Church | G06F 21/552 726/23 |

(Continued)

FOREIGN PATENT DOCUMENTS

WO    WO-2014/109645 A1    7/2014

OTHER PUBLICATIONS

P. Ashley et al, "Addressing Emerging Threats and Targeted Attacks with IBM Security Network Protection," IBM Redbook No. REDP-4826-01, Published Jul. 16, 2014.*

(Continued)

*Primary Examiner* — Robert Leung
(74) *Attorney, Agent, or Firm* — FisherBroyles LLP

(57) ABSTRACT

The disclosed computer-implemented method for classifying security events as targeted attacks may include (1) detecting a security event in connection with at least one organization, (2) comparing the security event against a targeted-attack taxonomy that identifies a plurality of characteristics of targeted attacks, (3) determining that the security event is likely targeting the organization based at least in part on comparing the security event against the targeted-attack taxonomy, and then in response to determining that the security event is likely targeting the organization, (4) classifying the security event as a targeted attack. Various other methods, systems, and computer-readable media are also disclosed.

16 Claims, 7 Drawing Sheets

(56) References Cited

U.S. PATENT DOCUMENTS

| | | | |
|---|---|---|---|
| 2008/0320095 A1* | 12/2008 | Pearson | H04L 12/585 709/207 |
| 2009/0094175 A1* | 4/2009 | Provos | G06F 21/577 706/12 |
| 2010/0162395 A1* | 6/2010 | Kennedy | G06F 21/563 726/23 |
| 2010/0192201 A1 | 7/2010 | Shimoni et al. | |
| 2010/0281539 A1* | 11/2010 | Burns | H04L 63/1441 726/23 |
| 2011/0067106 A1* | 3/2011 | Evans | G06F 21/552 726/23 |
| 2011/0296524 A1* | 12/2011 | Hines | G06F 21/552 726/22 |
| 2012/0096549 A1* | 4/2012 | Amini | H04L 63/1433 726/23 |
| 2012/0096551 A1* | 4/2012 | Lee | G06F 21/55 726/23 |
| 2013/0086685 A1 | 4/2013 | Haynes | |
| 2013/0104230 A1* | 4/2013 | Tang | G06F 21/552 726/23 |
| 2013/0145465 A1* | 6/2013 | Wang | G06F 21/552 726/23 |
| 2013/0305367 A1* | 11/2013 | Yoshioka | H04L 51/12 726/23 |
| 2013/0312097 A1 | 11/2013 | Turnbull | |
| 2014/0130157 A1 | 5/2014 | Sallam | |
| 2014/0165207 A1 | 6/2014 | Engel et al. | |
| 2014/0283035 A1 | 9/2014 | Sawhney et al. | |
| 2014/0324985 A1 | 10/2014 | Stemm | |
| 2015/0007312 A1 | 1/2015 | Pidathala et al. | |
| 2016/0094565 A1* | 3/2016 | Adams | H04L 63/1416 726/24 |

OTHER PUBLICATIONS

Iqbal, Farkhund et al., "A novel approach of mining write-prints for authorship attribution in e-mail forensics", Digital Investigation 5, (2008), pp. S42-S51.

Alazab, Mamoun et al., "Malicious Spam Emails Developments and Authorship Attribution", 2013 Fourth Cybercrime and Trustworthy Computing Workshop, Sydney NSW, Australia, (Nov. 21-22, 2013), pp. 58-68.

Kevin Roundy, et al; Systems and Methods for Anomaly-Based Detection of Compromised IT Administration Accounts; U.S. Appl. No. 14/205,335, filed Mar. 11, 2014.

Kevin Alejandro Roundy, et al; Systems and Methods for Attributing Potentially Malicious Email Campaigns to Known Threat Groups; U.S. Appl. No. 14/461,810, filed Aug. 18, 2014.

Yun Shen, et al; Systems and Methods for Identifying Security Threat Sources Responsible for Security Events; U.S. Appl. No. 14/519,565, filed Oct. 21, 2014.

"Industrial Espionage and Targeted Attacks: Understanding the Characteristics of an Escalating Threat", http://link.springer.com/chapter/10.1007%2F978-3-642-33338-5_4, as accessed on Jul. 31, 2014, (Sep. 12-14, 2012).

Mcwhorter, Dan "Mandiant Exposes APT1—One of China's Cyber Espionage Units & Releases 3,000 Indicators", https://www.mandiant.com/blog/mandiant-exposes-apt1-chinas-cyber-espionage-units-releases-3000-indicators/, as accessed on Jul. 31, 2014, (Feb. 18, 2013).

"Wombat Security Technologies", https://www.wombatsecurity.com/, as accessed Aug. 19, 2014, (Aug. 17, 2008).

Hu, Xin et al., "MutantX-S: Scalable Malware Clustering Based on Static Features", http://web.eecs.umich.edu/~huxin/papers/xin_MutantX.pdf, as accessed Aug. 19, 2014, 2013 USENIX Annual Technical Conference, (2013), pp. 187-198.

"FireEye", https://www.fireeye.com/, as accessed Aug. 19, 2014, (Oct. 12, 1999).

"Dell SecureWorks", http://www.secureworks.com/, as accessed Aug. 19, 2014, (Jan. 11, 1998).

"Mandiant", https://www.mandiant.com/, as accessed Aug. 19, 2014, (Feb. 4, 2006).

"Security Information & Event Management—SIEM", http://www8.hp.com/us/en/software-solutions/siem-security-information-event-management/, as accessed Aug. 19, 2014, Hewlett-Packard Development Company, L.P., (On or before Aug. 19, 2014).

"Cloud & Smarter Infrastructure", http://www.ibm.com/software/tivoli, as accessed Aug. 19, 2014, IBM, (Mar. 26, 2002).

"Business Assurance Technology", https://www.bluecoat.com/products/business-assurance-technology, as accessed Aug. 19, 2014, Blue Coat Systems, Inc., (On or before Aug. 19, 2014).

"Splunk®", http://www.splunk.com/en_us/solutions/solution-areas/security-and-fraud.html, as accessed Aug. 19, 2014, (On or before Aug. 19, 2014).

"LogRhythm", http://ecrm.logrhythm.com/P-Gartner2014MagicQuadrantSIEMReportLogRhythm-RT.html?utm_medium=cpc&utm_campaign=LogRhythmBrandTerms&AdGroup=LogRhythm&gclid=CjwKEAjw-o6hBRDOmsPSjqakuzYSJADR2V3SBBhEFHOQ-qwhx6DmQct0SnNlwIANXqwh Sq0YJ6BT-6BoCI0Hw_wcB, as accessed Aug. 19, 20014, (on or before Aug. 19, 2014).

"RSA enVision", http://www.emc.com/support/rsa/eops/siem.htm, as accessed Aug. 19, 2014, EMC Corporation, (Apr. 7, 2012).

"Cisco Security Manager", http://www.cisco.com/c/en/us/products/security/security-manager/index.html, as accessed Aug. 19, 2014, (Aug. 12, 2014).

"Emerald Security Group", http://www.esgroupusa.com/, as accessed Aug. 19, 2014, (Feb. 7, 2012).

Zhao, Yao et al., "BotGraph: Large Scale Spamming Botnet Detection", Proceedings of the 6th USENIX Symposium on Networked Systems Design and Implementation, NSDI'09, USENIX Association, Berkeley, CA, (2009), pp. 321-334.

Zhuang, Li et al., "Characterizing Botnets from Email Spam Records", Proceedings of the 1st Usenix Workshop on Large-Scale Exploits and Emergent Threats, LEET'08, USENIX Association, Berkeley, CA, (2008), pp. 2:1-2:9.

Singh, Kamaldeep et al., "Big Data Analytics framework for Peer-to-Peer Botnet detection using Random Forests", Information Sciences, vol. 278, (Mar. 29, 2014), pp. 488-497.

Zhang, Qunyan et al., "Duplicate Detection for Identifying Social Spam in Microblogs", 2013 IEEE International Congress on Big Data (BigData Congress), (Jun. 2013), pp. 141-148.

Caruana, Godwin et al., "An ontology enhanced parallel SVM for scalable spam filter training", Neurocomputing, vol. No. 108, (May 2013), pp. 45-57.

Debar, Hervé et al., "Aggregation and Correlation of Intrusion-Detection Alerts", RAID 2001, LNCS 2212, (2001), pp. 85-103.

Techniques for Detecting Malicious Code; U.S. Appl. No. 14/035,519, filed Sep. 24, 2013.

Wei, Chun, "Clustering Spam Domains and Hosts: Anti-Spam Forensics With Data Mining", A Dissertation, Submitted to the graduate faculty of The University of Alabama at Birmingham, in partial fulfillment of the requirements for the degree of Doctor of Philosophy, (2010).

Skormin, Victor et al., "Customized Normalcy Profiles for the Detection of Targeted Attacks", EvoApplications 2012, LNCS 7248, (Apr. 11, 2012), pp. 487-496.

Thonnard, Olivier et al., "Industrial Espionage and Targeted Attacks: Understanding the Characteristics of an Escalating Threat", Research in Attacks, Intrusions, and Defenses; Lecture Notes in Computer Science, vol. 7462, (Sep. 12-14, 2012), pp. 64-85.

* cited by examiner

```
                        Targeted-Attack Taxonomy
                                  120
------------------------------------------------------------------------------
**********************************************

CATEGORY 400(1):                Evidence of reconnaissance
        CHARACTERISTIC 122(1):         Detection of spearphishing emails
        CHARACTERISTIC 122(2):         Attack directed at high-value assets
        CHARACTERISTIC 122(3):         DLP detection of leaked infrastructure secrets
        CHARACTERISTIC 122(4):         Detection of smokescreen DDoS attack

•                               •
                •                               •
                •                               •

CATEGORY 400(N):                Use of stealthy backdoor
        CHARACTERISTIC 422(1):         Long dormant files that phone home sporadically
        CHARACTERISTIC 422(2):         Anomalous use of remote desktop or VNC
        CHARACTERISTIC 422(3):         Amount of network traffic sent by a particular file
        CHARACTERISTIC 422(4):         Anomalous network behavior at night or weekends

SYSTEMS AND METHODS FOR CLASSIFYING SECURITY EVENTS AS TARGETED ATTACKS

BACKGROUND

Computer security systems are often used to detect malicious attacks on computing devices. For example, a computing device may include a computer security system. In this example, the computer security system may detect a malicious file that infiltrated the computing device via the Internet.

Unfortunately, some conventional computer security systems may be unable to distinguish between common malware and targeted attacks. For example, certain organizations (such as corporations and/or government entities) may have computing devices that include conventional computer security systems. In this example, the conventional computer security systems may be unable to determine whether a malicious security event represents common malware or part of a comprehensive targeted attack.

Even in the event that certain conventional computer security systems are able to distinguish between common malware and targeted attacks, these security systems may rely on a preexisting signature database. As a result, these security systems may be unable to accurately classify unknown security events (e.g., zero-day threats) as targeted attacks in the absence of updated signatures that are specifically tailored to such security events. The instant disclosure, therefore, identifies and addresses a need for improved systems and methods for classifying security events as targeted attacks.

SUMMARY

As will be described in greater detail below, the instant disclosure describes various systems and methods for classifying security events as targeted attacks by comparing the security events against a targeted-attack taxonomy that identifies various characteristics of targeted attacks.

In one example, a computer-implemented method for classifying security events as targeted attacks may include (1) detecting a security event in connection with at least one organization, (2) comparing the security event against a targeted-attack taxonomy that identifies a plurality of characteristics of targeted attacks, (3) determining that the security event is likely targeting the organization based at least in part on comparing the security event against the targeted-attack taxonomy, and then in response to determining that the security event is likely targeting the organization, (4) classifying the security event as a targeted attack. In this example, the method may further include notifying the organization that the security event has been classified as a targeted attack.

In one example, the method may also include identifying a plurality of features of the security event. In this example, the method may further include comparing the plurality of features of the security event against the plurality of characteristics identified in the targeted-attack taxonomy.

In one example, the method may also include determining the number of features of the security event that match corresponding characteristics identified in the targeted-attack taxonomy. In this example, the method may further include determining that the number of features of the security event that match the corresponding characteristics identified in the targeted-attack taxonomy exceeds a certain threshold.

In one example, the method may also include calculating a taxonomy score that represents the likelihood that the security event is targeting the organization based at least in part on comparing the security event against the targeted-attack taxonomy. In this example, the method may further include determining that the taxonomy score exceeds a certain threshold. Additionally or alternatively, the method may include weighting at least one of the characteristics identified in the targeted-attack taxonomy to increase or decrease the characteristic's influence in the calculation of the taxonomy score.

In one example, the targeted-attack taxonomy may include a plurality of categories. In this example, the plurality of categories may each include a plurality of characteristics of targeted attacks. Additionally or alternatively, the method may include calculating a category score for each category within the plurality of categories included in the targeted-attack taxonomy based at least in part on comparing the security event against the targeted-attack taxonomy.

In one example, the method may also include determining that each category score exceeds a corresponding threshold. Additionally or alternatively, the method may include calculating a taxonomy score that represents the likelihood that the security event is targeting the organization based at least in part on each category score. The method may further include determining that the taxonomy score exceeds a certain threshold. Moreover, the method may include weighting at least one category score to increase or decrease the category score's influence in the calculation of the taxonomy score.

In one example, the method may also include collecting security-related telemetry data from at least one security system. In this example, the method may further include identifying a plurality of characteristics indicative of targeted attacks within the security-related telemetry data. Additionally or alternatively, the method may include creating the targeted-attack taxonomy from the plurality of characteristics indicative of targeted attacks.

As another example, a system for implementing the above-described method may include (1) a detection module, stored in memory, that detects a security event in connection with at least one organization, (2) a determination module, stored in memory, that (A) compares the security event against a targeted-attack taxonomy that identifies a plurality of characteristics of targeted attacks and then (B) determines that the security event is likely targeting the organization based at least in part on comparing the security event against the targeted-attack taxonomy, (3) a classification module, stored in memory, that classifies the security event as a targeted attack in response to the determination that the security event is likely targeting the organization, and (4) at least one processor that executes the detection module, the determination module, and the classification module.

As a further example, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a security event in connection with at least one organization, (2) compare the security event against a targeted-attack taxonomy that identifies a plurality of characteristics of targeted attacks, (3) determine that the security event is likely targeting the organization based at least in part on comparing the security event against the targeted-attack taxonomy, and then in response to determining that the security event is likely targeting the organization, (4) classify the security event as a targeted attack.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of an exemplary targeted-attack taxonomy.

Figure 1:
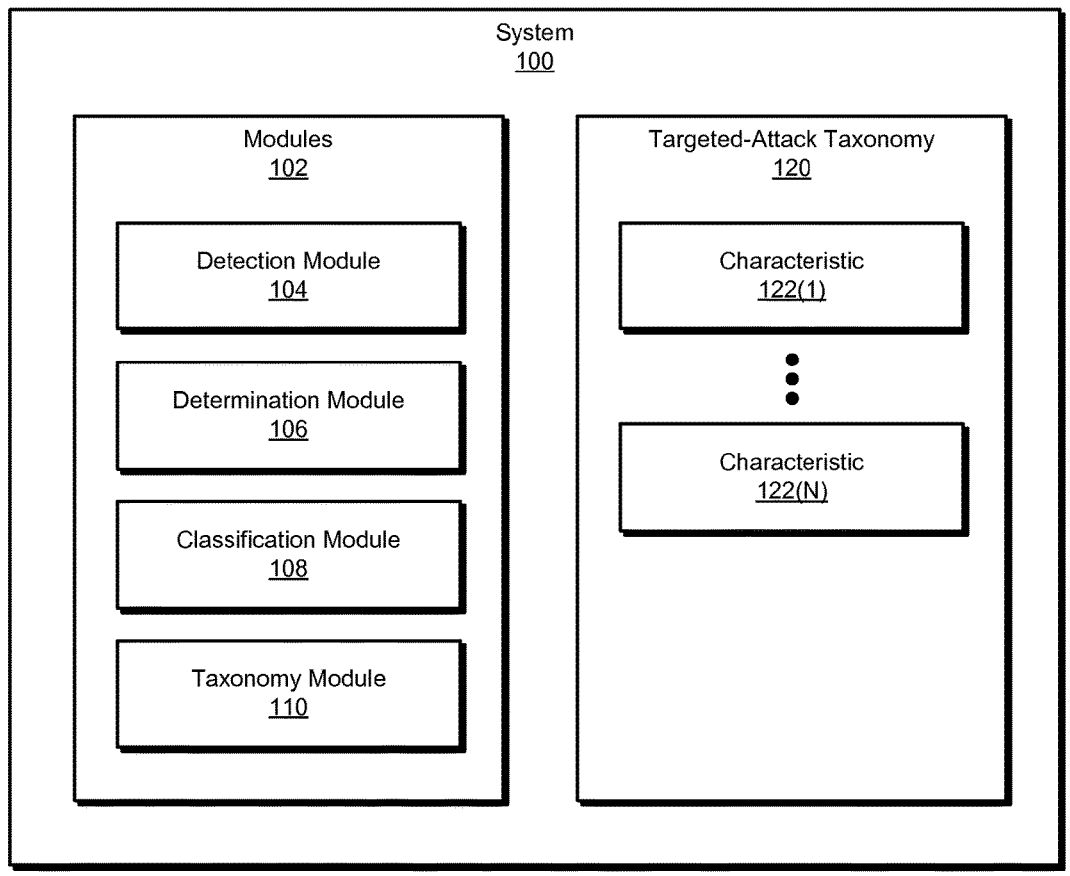
FIG. 1 is a block diagram of an exemplary system for classifying security events as targeted attacks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for classifying security events as targeted attacks. As will be explained in greater detail below, by collecting security-related telemetry data from different security systems, the various systems and methods described herein may identify a plurality of characteristics indicative of targeted attacks within the security-related telemetry data. These systems and methods may then create a targeted-attack taxonomy from the plurality of characteristics identified within the security-related telemetry data.

Upon creating the targeted-attack taxonomy, these systems and method may compare detected security events against the targeted-attack taxonomy. By comparing the detected security events against the targeted-attack taxonomy, these systems and methods may be able to classify certain unknown security events (e.g., zero-day threats) as part of a targeted attack even prior to the creation of new behavioral signatures specifically tailored to such security events. Accordingly, these systems and methods may facilitate a somewhat heuristic-based approach (as opposed to a purely signature-based approach) to classifying security events as part of a targeted attack.

Figure 2:
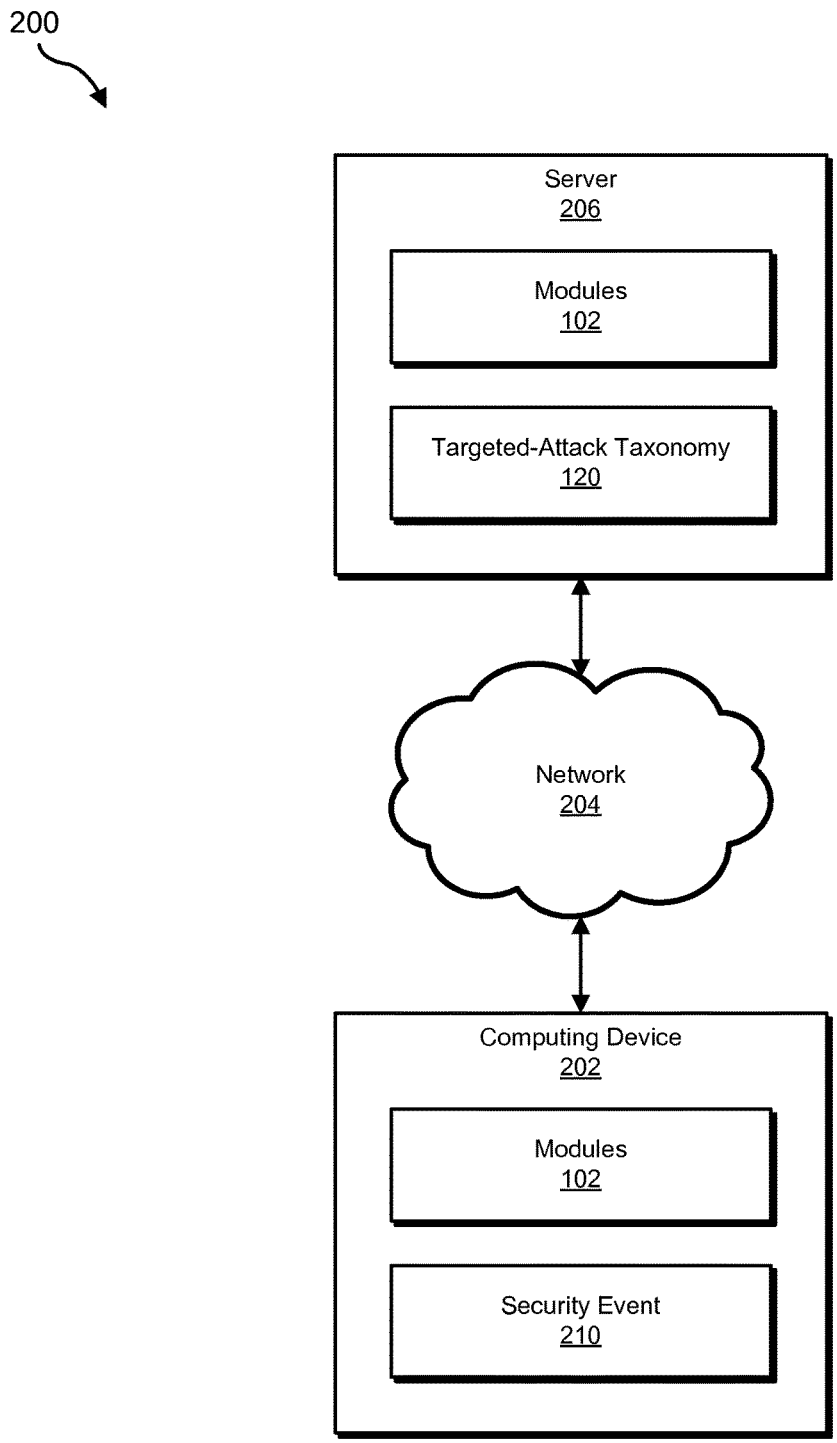
FIG. 2 is a block diagram of an additional exemplary system for classifying security events as targeted attacks.

The following will provide, with reference to FIGS. 1-2, detailed descriptions of exemplary systems for classifying security events as targeted attacks. Detailed descriptions of corresponding computer-implemented methods will also be provided in connection with FIG. 3. Detailed descriptions of exemplary targeted-attack taxonomies will be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for classifying security events as targeted attacks. As illustrated in this figure, exemplary system 100 may include one or more modules 102 for performing one or more tasks. For example, and as will be explained in greater detail below, exemplary system 100 may include a detection module 104 that detects a security event in connection with at least one organization. Exemplary system 100 may also include a determination module 106 that compares the security event against a targeted-attack taxonomy that identifies a plurality of characteristics of targeted attacks and then determines that the security event is likely targeting the organization based at least in part on this comparison.

In addition, and as will be described in greater detail below, exemplary system 100 may include a classification module 108 that classifies the security event as a targeted attack in response to the determination that the security event is likely targeting the organization. Although illustrated as separate elements, one or more of modules 102 in FIG. 1 may represent portions of a single module or application (such as a Security Information Management (SIM) application, a Security Event Management (SEM) application, and/or a Security Information and Event Management (SIEM) application).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more taxonomies, such as targeted-attack taxonomy 120. The term "taxonomy," as used herein, generally refers to any type or form of ontology, heuristic, model, and/or set of rules used to classify security events based at least in part on certain characteristics and/or features of the security events. In one example, targeted-attack taxonomy 120 may include and/or identify a plurality of characteristics 122(1)-(N) of targeted attacks. In this example, characteristics 122(1)-(N) may represent a collection of features previously observed in connection with known targeted attacks. Additionally or alternatively, characteristics 122(1)-(N) may represent metadata about certain behavioral signatures used to classify security events as targeted attacks.

Examples of characteristics 122(1)-(N) include, without limitation, evidence of reconnaissance, detection of spear-phishing emails, whether an attack is directed at high-value assets, Data Loss Prevention (DLP) detection of leaked infrastructure secrets, whether an attack involves a smokescreen Distributed Denial of Service (DDoS), use of a stealthy backdoor, whether an attack involves an otherwise dormant file that phones home sporadically, anomalous use of a remote desktop and/or a Virtual Network Computing (VNC) tool, a suspicious amount of network traffic sent by a particular file in connection with an attack, anomalous network behavior at night and/or weekends, whether an attack involves reading a password file, variations of one or more of the same, combinations of one or more of the same, or any other characteristics of targeted attacks.

Targeted-attack taxonomy 120 may represent portions of a single database or computing device or a plurality of databases or computing devices. For example, targeted-attack taxonomy 120 in FIG. 1 may represent a portion of computing device 202 and/or server 206 in FIG. 2, computing system 610 in FIG. 6, and/or portions of exemplary network architecture 700 in FIG. 7. Alternatively, targeted-attack taxonomy 120 in FIG. 1 may represent one or more physically separate devices capable of being accessed by a computing device, such as computing device 202 and/or server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. In this example, computing device 202 may store all or a portion of targeted-attack taxonomy 120 and/or detect a security event 210.

Additionally or alternatively, server 206 may be programmed with one or more of modules 102. In this example, server 206 may store all or a portion of targeted-attack taxonomy 120 and/or detect security event 210. The term "security event," as used herein, generally refers to any type or form of event, process, alert, and/or application that potentially implicates and/or affects the security of a computing device and/or network. Examples of security event 210 include, without limitation, transmission and/or reception of emails, downloading and/or uploading files, creating and/or executing files, network activity and/or communications, malware infections, social-engineering attacks, suspicious activity, variations of one or more of the same, combinations of one or more of the same, or any other security events.

In one embodiment, one or more of modules 102 from FIG. 1 may, when executed by at least one processor of computing device 202 and/or server 206, enable computing device 202 and/or server 206 to classify security events as targeted attacks. For example, and as will be described in greater detail below, one or more of modules 102 may cause computing device 202 and/or server 206 to (1) detect security event 210 in connection with at least one organization, (2) compare security event 210 against targeted-attack taxonomy 120 that identifies a plurality of characteristics 122(1)-(N) of targeted attacks, (3) determine that security event 210 is likely targeting the organization based at least in part on comparing security event 210 against targeted-attack taxonomy 120, and then (4) classify security event 210 as a targeted attack in response to determining that security event 210 is likely targeting the organization.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device capable of classifying security events as targeted attacks. Examples of server 206 include, without limitation, security servers, application servers, web servers, storage servers, and/or database servers configured to run certain software applications and/or provide various security, web, storage, and/or database services. In one example, server 206 may belong to a security service provider responsible for protecting the targeted organization against cyberattacks. Although illustrated as a single device, server 206 may represent a plurality of servers working in conjunction with one another to protect the targeted organization against cyberattacks.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
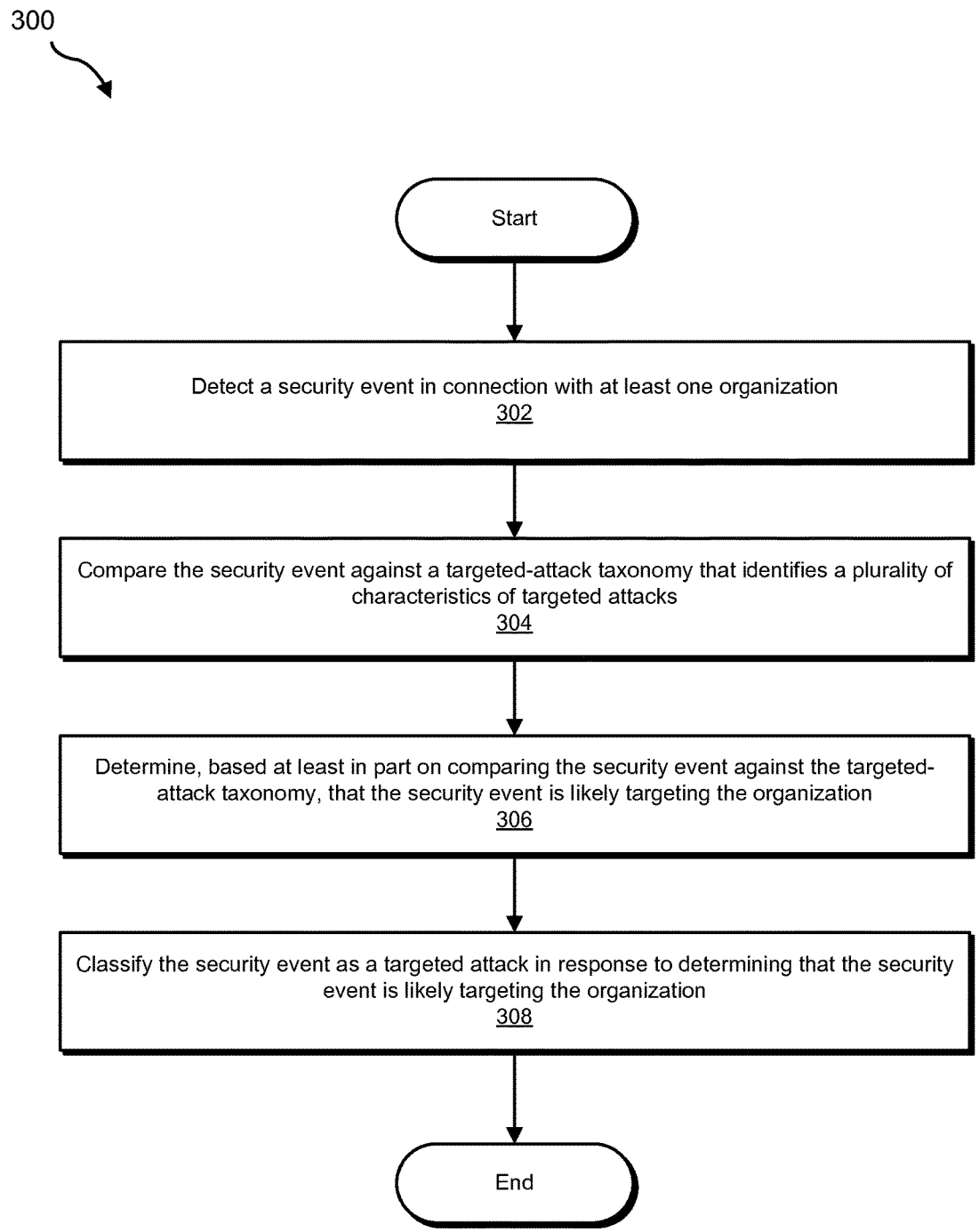
FIG. 3 is a flow diagram of an exemplary method for classifying security events as targeted attacks.

FIG. 3 is a flow diagram of an exemplary computer-implemented method 300 for classifying security events as targeted attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may detect a security event in connection with at least one organization. For example, detection module 104 may, as part of computing device 202 and/or server 206 in FIG. 2, detect security event 210 in connection with at least one organization. Examples of such an organization include, without limitation, corporations, government entities, military entities, businesses, security customer bases, schools, colleges, universities, institutions, associations, groups, collectives, think tanks, variations of one or more of the same, combinations of one or more of the same, or any other suitable organization.

The systems described herein may perform step 302 in a variety of ways and/or contexts. In some examples, detection module 104 may detect security event 210 by monitoring certain computing activity within the organization. In one example, detection module 104 may monitor the computing activity of a member and/or employee of the organization. For example, detection module 104 may monitor the computing activity of computing device 202 operated by a member and/or employee of the organization. In this example, detection module 104 may detect security event 210 while monitoring the computing activity of computing device 202.

In some examples, detection module 104 may detect security event 210 by mining and/or analyzing security-related data and/or information (e.g., telemetry data) collected from certain security systems implemented by the organization. For example, detection module 104 may represent part of a SIEM application implemented by the organization. In this example, the SIEM application may collect various security alerts from certain firewalls, network Intrusion Detection Systems (IDSes), antivirus solutions, and/or DLP solutions running on the organization's computing devices and/or networks. As the SIEM application collects the security alerts, detection module 104 may mine and/or analyze these security alerts for evidence of targeted attacks. Accordingly, detection module 104 may detect security event 210 while mining and/or analyzing these alerts.

Returning to FIG. 3, at step 304 one or more of the systems described herein may compare the security event against a targeted-attack taxonomy that identifies a plurality of characteristics of targeted attacks. For example, determination module 106 may, as part of computing device 202 and/or server 206 in FIG. 2, compare security event 210 against targeted-attack taxonomy 120 that identifies a plurality of characteristics 122(1)-(N) of targeted attacks. The term "targeted attack," as used herein, generally refers to any type or form of computer-based attack and/or campaign that is specifically targeting one or more organizations.

In one example, a targeted attack may target a single organization. In another example, a targeted attack may target a plurality of organizations. Additionally or alternatively, portions of a targeted attack may have been reused and/or recycled from one or more previous targeted attacks perpetrated by a specific threat group.

The systems described herein may perform step 304 in a variety of ways and/or contexts. In one example, determination module 106 may compare security event 210 against targeted-attack taxonomy 120 based at least in part on certain characteristics and/or features of security event 210. For example, determination module 106 may identify a plurality of features of security event 210. In this example, determination module 106 may compare the plurality of features of security event 210 against the plurality of characteristics 122(1)-(N) identified in targeted-attack taxonomy 120.

Examples of such features of security event 210 include, without limitation, evidence of reconnaissance, spearphishing emails, whether security event 210 is directed at high-value assets, leaked infrastructure secrets, whether security event 210 involves a smokescreen DDoS, use of a stealthy backdoor, whether security event 210 involves an otherwise dormant file that phones home sporadically, anomalous use of a remote desktop and/or a VNC tool, a suspicious amount of network traffic sent by a particular file in connection with security event 210, anomalous network behavior at night and/or weekends, whether security event 210 involves reading a password file, variations of one or more of the same, combinations of one or more of the same, or any other features of security event 210.

In one example, determination module 106 may identify each of the features of security event 210 that matches at least one of characteristics 122(1)-(N) identified in targeted-attack taxonomy 120. For example, determination module 106 may iterate through targeted-attack taxonomy 120 characteristic-by-characteristic for each identified feature of security event 210. In this example, determination module 106 may identify each feature of security event 210 that matches at least one of characteristics 122(1)-(N) based at least in part on these iterations. Determination module 106 may then label each matching feature with an indicator denoting the same. Additionally or alternatively, determination module 106 may label each matching feature with an indicator that identifies the number of characteristics matched by the feature.

Figure 4:
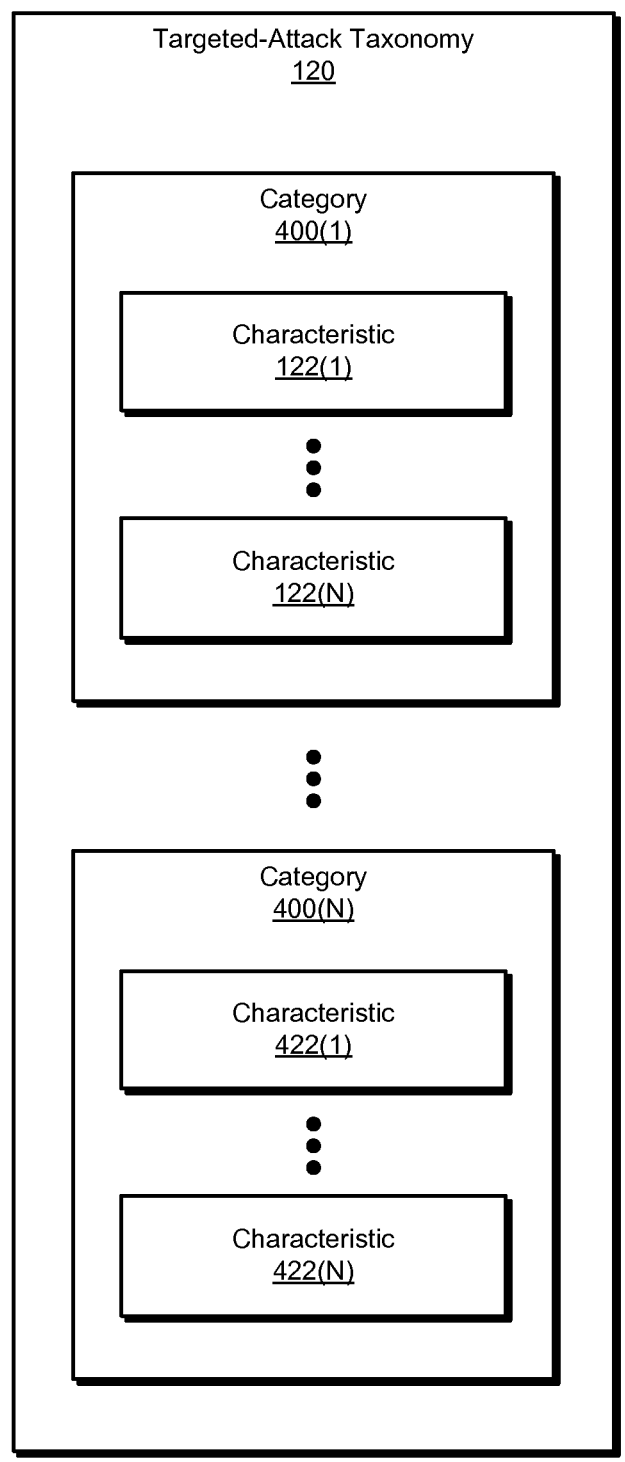
FIG. 4 is a block diagram of an exemplary targeted-attack taxonomy.

FIG. 4 is a block diagram of an exemplary targeted-attack taxonomy 120. As illustrated in FIG. 4, targeted-attack taxonomy 120 may include and/or identify a plurality of categories 400(1)-(N) that each include and/or identify characteristics of targeted attacks. The term "category," as used herein, generally refers to any type or form of clustering and/or grouping of characteristics within a taxonomy. In one example, category 400(1) in FIG. 4 may cluster and/or group characteristics 122(1)-(N) of targeted attacks together based at least in part on certain commonalities, techniques, and/or features. Similarly, category 400(N) in FIG. 4 may cluster and/or group characteristics 422(1)-(N) of targeted attacks together based at least in part on certain commonalities, techniques, and/or features. Examples of categories 400(1)-(N) include, without limitation, evidence of reconnaissance, use of a stealthy backdoor, lateral movement, exfiltration, human-driven attack behavior, attack sophistication, level of risk, variations of one or more of the same, combinations of one or more of the same, or any other suitable categories.

FIG. 5 is an illustration of an exemplary targeted-attack taxonomy 120. As illustrated in FIG. 5, targeted-attack taxonomy 120 may include and/or identify exemplary categories 400(1)-(N) (in this example, "Evidence of reconnaissance," "Use of stealthy backdoor," and so on), exemplary characteristics 122(1)-(4) (in this example, "Detection of spearphishing emails", "Attack directed at high-value assets," "DLP detection of leaked infrastructure secrets," "Detection of smokescreen DDoS attack"), and exemplary characteristics 422(1)-(4) (in this example, "Long dormant files that phone home sporadically," "Anomalous use of remote desktop or VNC," "Amount of network traffic sent by a particular file," and "Anomalous network behavior at night or weekends").

In some examples, one or more of the systems described herein may create targeted-attack taxonomy 120. In one example, taxonomy module 110 may, as part of computing device 202 and/or server 206 in FIG. 2, create targeted-attack taxonomy 120 based at least in part on certain characteristics that are potentially indicative of targeted attacks. For example, taxonomy module 110 may collect security-related telemetry data from certain firewalls, network IDSes, antivirus solutions, and/or DLP solutions running on the organization's computing devices. Upon collecting the security-related telemetry data, taxonomy module 110 may mine and/or analyze the security-related telemetry data for certain characteristics that are potentially indicative of targeted attacks. Taxonomy module 110 may then create targeted-attack taxonomy 120 based at least in part on the mining and/or analysis of this security-related telemetry data.

As a specific example, taxonomy module 110 may apply certain Multi-Criteria Decision Analysis (MCDA) techniques to the security-related telemetry data. The term "Multi-Criteria Decision Analysis" and the abbreviation "MCDA," as used herein, generally refer to any type or form of algorithm and/or analysis that clusters and/or groups security-related data and/or information into data sets based at least in part on certain commonalities, techniques, and/or features. Accordingly, MCDA techniques may enable taxonomy module 110 to identify complex patterns and/or relationships among certain security events in connection with the organization. For example, taxonomy module 110 may apply MCDA techniques to security events involving certain members and/or employees of the organization. By applying the MCDA techniques to these security events, taxonomy module 110 may be able to cluster and/or group characteristics 122(1)-(N) and/or 422(1)-(N) and then create target-attack taxonomy 120 based at least in part on these clusters and/or groups.

Additionally or alternatively, taxonomy module 110 may apply MCDA techniques to targeted-attack taxonomy 120 to increase its level of classification accuracy. In one example, taxonomy module 110 may apply MCDA techniques to determine and/or select a particular threshold for one or more of categories 400(1)-(N). For example, taxonomy module 110 may determine that the features of any specific security event need to match at least 3 of characteristics 122(1)-(N) included in category 400(1) to classify security event 210 as a targeted attack. As a result, taxonomy module 110 may select a threshold of 3 for category 400(1). In the event that the features of any specific security event do not match at least 3 of characteristics 122(1)-(N), the specific security event may be classified as a non-targeted attack.

In another example, taxonomy module 110 may apply MCDA techniques to determine and/or select certain weights for categories 400(1)-(N) and/or characteristics 122(1)-(N) or 422(1)-(N). For example, taxonomy module 110 may weight at least one of categories 400(1)-(N) relative to one another. As a specific example, taxonomy module 110 may weight category 400(1) by a factor or 2 relative to category 400(N). By weighting at least one of categories 400(1)-(N) in this way, taxonomy module 110 may increase or decrease that category's influence in calculating a taxonomy score for any specific security event.

Additionally or alternatively, taxonomy module 110 may weight at least one of characteristics 122(1)-(N) or 422(1)-(N) relative to one another. For example, taxonomy module 110 may weight characteristic 122(1) by a factor of 3 relative to characteristics 122(N) and/or 422(1)-(N). By weighting at least one of categories 400(1)-(N) and/or characteristics 122(1)-(N) or 422(1)-(N) in this way, taxonomy module 110 may increase or decrease the characteristic's influence in calculating a taxonomy score for any specific security event. The term "taxonomy score," as used herein, generally refers to any type or form of score, number, and/or calculation that results from comparing a security event against a taxonomy. The taxonomy score may represent the likelihood that the security event is targeting an organization.

In one example, taxonomy module 110 may apply MCDA techniques to achieve Ordered Weighted Averaging (OWA) for categories 400(1)-(N) and/or characteristics 122(1)-(N) or 422(1)-(N). Additionally or alternatively, taxonomy module 110 may enable a user to control the weighting of one or more of categories 400(1)-(N) and/or characteristics 122(1)-(N) or 422(1)-(N).

Returning to FIG. 3, at step 306 one or more of the systems described herein may determine that the security event is likely targeting the organization based at least in part on the comparison of the security event against the targeted-attack taxonomy. For example, determination module 106 may, as part of computing device 202 and/or server 206 in FIG. 2, determine that security event 210 is likely targeting the organization based at least in part on the comparison of security event 210 against targeted-attack taxonomy 120. The phrase "to target" or "targeting," as used herein, generally refers to any type or form of goal, aim, and/or intent directed to and/or meant for at least one specific organization (as opposed to any indiscriminate organization or users).

The systems described herein may perform step 306 in a variety of ways and/or contexts. In some examples, determination module 106 may determine that security event 210 is likely targeting the organization based at least in part on the number of features of security event 210 that match at least one of characteristics 122(1)-(N). For example, determination module 106 may determine that 12 features of security event 210 match at least one of characteristics 122(1)-(N) identified in the targeted-attack taxonomy 120. In this example, determination module 106 may determine that these 12 matching features of security event 210 exceed a certain threshold (e.g., at least 10 matching features). Determination module 106 may then determine that security event 210 is likely targeting the organization since the number of matching features of security event 210 exceeds the threshold.

In some examples, determination module 106 may determine that security event 210 is likely targeting the organization based at least in part on a taxonomy score for security event 210. For example, determination module 106 may calculate a taxonomy score of 55% for security event 210. In this example, the taxonomy score may indicate that 55% of the identified features of security event 210 match at least one of characteristics 122(1)-(N) identified in the targeted-attack taxonomy 120. Upon calculating the taxonomy score for security event 210, determination module 106 may determine that this taxonomy score exceeds a certain threshold (e.g., at least 50%). Determination module 106 may then determine that security event 210 is likely targeting the organization since the taxonomy score for security event 210 exceeds the threshold.

In some examples, determination module 106 may determine that security event 210 is likely targeting the organization based at least in part on certain category scores for categories 400(1)-(N). For example, determination module 106 may calculate a category score of 50% for category 400(1) and a category score of 60% for category 400(N) with respect to security event 210. In this example, each category score may indicate the number and/or percentage of characteristics included in the corresponding category that are matched by at least one feature of security event 210. Upon calculating these category scores with respect to security event 210, determination module 106 may determine that these category scores each exceed a corresponding threshold (e.g., at least 45% and 55%, respectively). Determination module 106 may then determine that security event 210 is likely targeting the organization since all of these category scores exceed their corresponding thresholds.

In some examples, determination module 106 may determine that security event 210 is likely targeting the organization based at least in part on the number of categories whose characteristics are matched by at least one feature of security event 210. For example, determination module 106 may determine that the features of security event 210 match at least one of the characteristics included in 5 different categories of targeted-attack taxonomy 120. In other words, determination module 106 may determine that the features of security event 210 span 5 different categories included targeted-attack taxonomy 120. Additionally or alternatively, determination module 106 may determine that the number of categories spanned by the features of security event 210 exceeds a certain threshold (e.g., at least 3 categories). Determination module 106 may then determine that security event 210 is likely targeting the organization since the number of categories spanned by the features of security event 210 exceeds the threshold.

Returning to FIG. 3, at step 308 one or more of the systems described herein may classify the security event as a targeted attack in response to the determination that the security event is likely targeting the organization. For example, classification module 108 may, as part of computing device 202 and/or server 206 in FIG. 2, classify security event 210 as a targeted attack (or at least part of a targeted attack) in response to the determination that security event 210 is likely targeting the organization.

The systems described herein may perform step 308 in a variety of ways and/or contexts. In some examples, classification module 108 may classify security event 210 as a targeted attack by labeling security event 210. For example, classification module 108 may label security event 210 as being part of a targeted attack on the organization. In this example, the label may effectively classify security event 210 as a part of the targeted attack on the organization.

In some examples, classification module 108 may classify security event 210 as a targeted attack by attributing security event 210 to a known threat group. For example, determination module 106 may determine that security event 210 is likely perpetrated by a threat group known as the "Purple Token" based at least in part on the comparison of security event 210 against targeted-attack taxonomy 120. As a result, classification module 108 may label security event 210 as being perpetrated by the "Purple Token" threat group. This label may effectively attribute security event 210 to the "Purple Token" threat group.

In some examples, classification module 108 may classify security event 210 as a targeted attack by clustering and/or grouping security event 210 with one or more other security events. For example, determination module 106 may determine that security event 210 and one or more other security events likely represent parts of the same targeted attack based at least in part on the comparison of security event 210 against targeted-attack taxonomy 120. As a result, classification module 108 may label security event 210 and/or the other security events as being respective parts of the same targeted attack. This label may effectively cluster and/or group security event 210 with the other security events in connection with the targeted attack.

In one example, classification module 108 may notify the targeted organization that security event 210 is likely a targeted attack. For example, classification module 108 may notify an Information Technology (IT) specialist at the organization that the "Purple Token" threat group is attempting to penetrate, infiltrate, and/or infect the organization by way of security event 210 and/or the targeted attack. By notifying the IT specialist of this attempt, classification module 108 may enable the IT specialist at the targeted organization to deploy an effective response in time to mitigate and/or neutralize security event 210 and/or the targeted attack.

Additionally or alternatively, classification module 108 may label any malicious executables involved in and/or related to security event 210 and/or the targeted attack. For example, classification module 108 may identify a malicious executable transferred in connection with security event 210. Classification module 108 may then label this malicious executable as being involved in and/or related to security event 210. This label may effectively link this malicious executable to security event 210 and/or the targeted attack.

In one example, classification module 108 may notify at least one user and/or organization whose computing devices have been infected by the malicious executable. For example, classification module 108 may notify the IT specialist at the targeted organization that the malicious executable has infected one or more computing devices belonging to the targeted organization. In this example, the notification may indicate that the "Purple Token" threat group authored and/or distributed the malicious executable. By notifying the IT specialist of this infection, classification module 108 may enable the IT specialist to deploy an effective response in time to mitigate and/or neutralize any harm caused by the malicious executable.

As explained above in connection with method 300 in FIG. 3, a SIEM may create a taxonomy of characteristics that are indicative of targeted attacks. In one example, this SIEM may identify a security event by collecting security-related telemetry data from various security systems protecting an organization's computing devices and/or networks. Upon identifying the security event, the SIEM may score the security event based at least in part on the amount of characteristics that are shared by and/or common to both the security event and the taxonomy.

This score may essentially represent the likelihood that the security event is targeting the organization. In other words, the score may reflect the amount of evidence suggesting that the security event is a targeted attack or just indiscriminate malware. On the one hand, in the event that the security event and the taxonomy share a relatively high number of characteristics, the score for the security event may be relatively high, thereby suggesting that the security event is a targeted attack. On the other hand, in the event that the security event and the taxonomy share a relatively low number of characteristics, the score for the security event may be relatively low, thereby suggesting that the security event is an indiscriminate, non-targeted attack.

Figure 6:
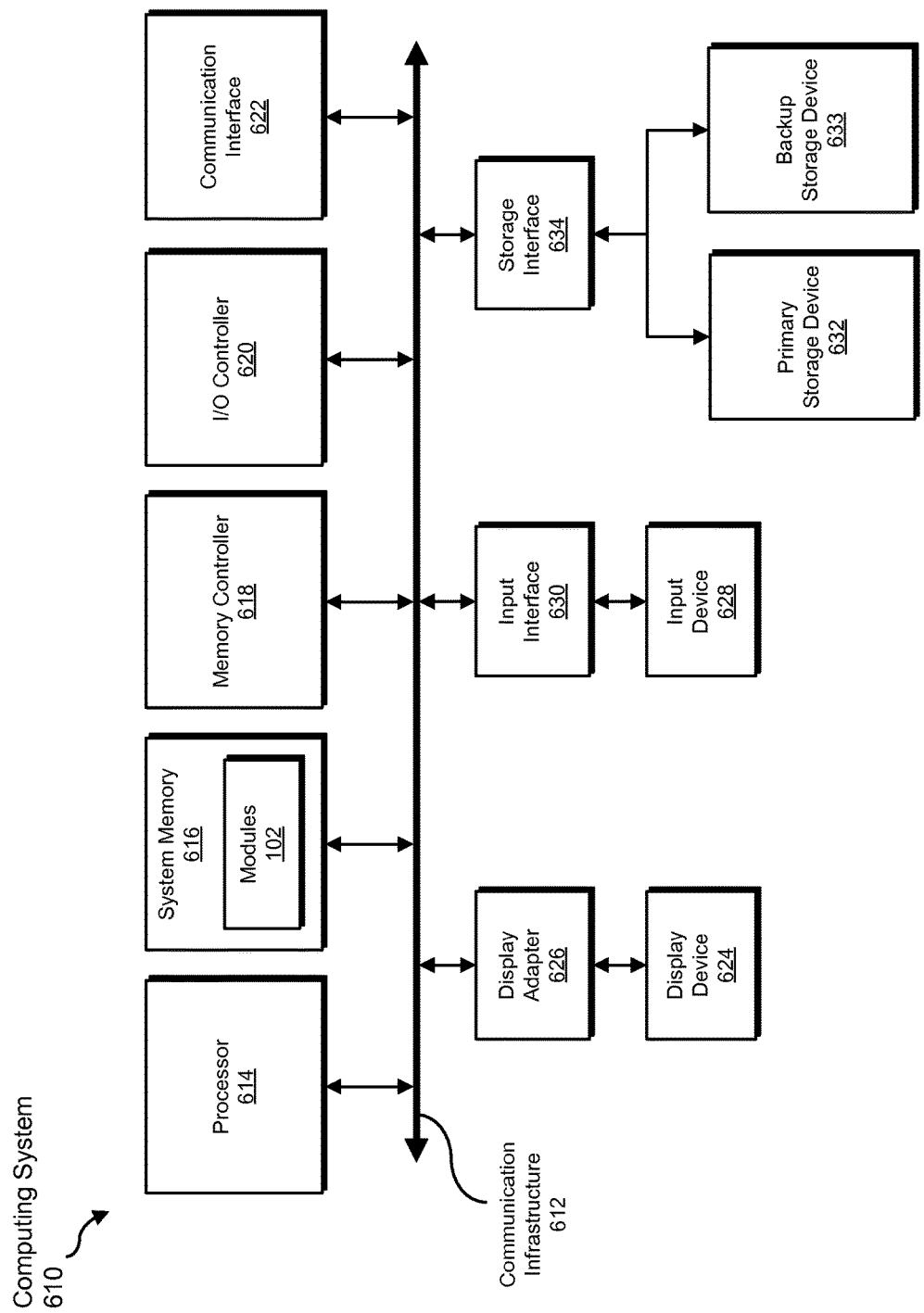
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
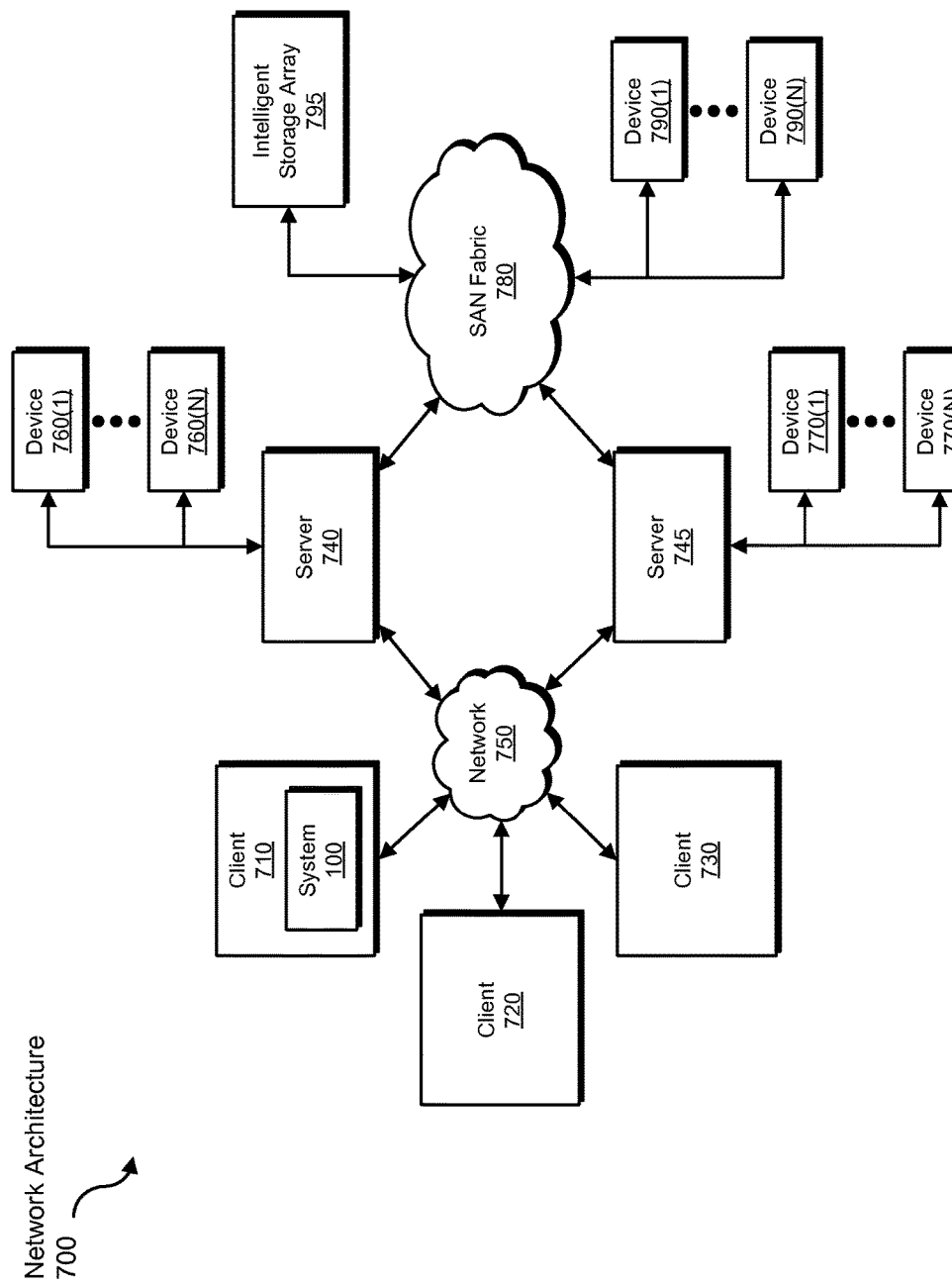
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for classifying security events as targeted attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive security-related telemetry data to be transformed, transform the security-related telemetry data, output a result of the transformation as a targeted-attack taxonomy, use the result of the transformation to identify targeted attacks, and store the result of the transformation for future use. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for classifying security events as targeted attacks, at least a portion of the method being performed by a computing device comprising at least one processor, the method comprising:
    detecting at least one malicious security event in connection with at least one organization;
    comparing the malicious security event against a targeted-attack taxonomy that comprises a plurality of categories, each category including a plurality of characteristics of targeted attacks;
    determining, based at least in part on comparing the malicious security event against the targeted-attack taxonomy, that the malicious security event is likely specifically targeting the organization by:
        calculating, based at least in part on comparing the malicious security event against the targeted-attack taxonomy, a category score for each category within the plurality of categories included in the targeted-attack taxonomy;
        determining the number of features of the malicious security event that match corresponding characteristics identified in the targeted-attack taxonomy;
        calculating, based at least in part on each category score and the number of features of the malicious security event that match corresponding characteristics identified in the targeted-attack taxonomy, a taxonomy score that represents the likelihood that the malicious security event is part of a targeted attack campaign as opposed to an indiscriminate or non-targeted attack; and
        determining that the taxonomy score exceeds a certain threshold; and
    in response to determining that the malicious security event is likely specifically targeting the organization, classifying the malicious security event as part of a targeted attack campaign that is specifically targeting the organization instead of an indiscriminate or non-targeted attack.

2. The method of claim 1, wherein comparing the malicious security event against the targeted-attack taxonomy comprises:
    identifying a plurality of features of the malicious security event; and
    comparing the plurality of features of the malicious security event against the plurality of characteristics identified in the targeted-attack taxonomy.

3. The method of claim 1, further comprising weighting at least one of the characteristics identified in the targeted-attack taxonomy to increase or decrease the characteristic's influence in the calculation of the taxonomy score.

4. The method of claim 1, wherein determining that the malicious security event is likely targeting the organization comprises determining that each category score exceeds a corresponding threshold.

5. The method of claim 1,
    further comprising weighting at least one category score to increase or decrease the category score's influence in the calculation of the taxonomy score.

6. The method of claim 1, further comprising:
    collecting security-related telemetry data from at least one security system;
    identifying, within the security-related telemetry data, a plurality of characteristics indicative of targeted attacks; and
    creating the targeted-attack taxonomy from the plurality of characteristics indicative of targeted attacks.

7. The method of claim 1, further comprising notifying the organization that the malicious security event has been classified as part of a targeted attack campaign that is specifically targeting the organization.

8. The method of claim 1, wherein classifying the malicious security event as part of the targeted attack campaign comprises labeling the malicious security event to indicate that the malicious security event is part of the targeted attack campaign.

9. The method of claim 8, further comprising:
    detecting another malicious security event in connection with the organization;
    comparing the other malicious security event against the targeted-attack taxonomy;
    determining, based at least in part on comparing the other malicious security event against the targeted-attack taxonomy, that the other malicious security event is likely specifically targeting the organization;
    classifying the other malicious security event as another part of the targeted attack campaign that is specifically targeting the organization instead of an indiscriminate or non-targeted attack; and
    labeling the other malicious security event to indicate that the other security event is part of the same targeted attack campaign as the malicious security event.

10. A system for classifying malicious security events as targeted attacks, the system comprising:
    a detection module, stored in memory, that detects a malicious security event in connection with at least one organization;
    a determination module, stored in memory, that:
        compares the malicious security event against a targeted-attack taxonomy that comprises a plurality of categories, each category including a plurality of characteristics of targeted attacks;
        determines, based at least in part on comparing the malicious security event against the targeted-attack taxonomy, that the malicious security event is likely specifically targeting the organization by:
            calculating, based at least in part on comparing the malicious security event against the targeted-attack taxonomy, a category score for each category within the plurality of categories included in the targeted-attack taxonomy;

determining the number of features of the malicious security event that match corresponding characteristics identified in the targeted-attack taxonomy;

calculating, based at least in part on each category score and the number of features of the malicious security event that match corresponding characteristics identified in the targeted-attack taxonomy, a taxonomy score that represents the likelihood that the malicious security event is part of a targeted attack campaign as opposed to an indiscriminate or non-targeted attack;

determining that the taxonomy score exceeds a certain threshold; and a classification module, stored in memory, that classifies the malicious security event as part of a targeted attack campaign that is specifically targeting the organization instead of an indiscriminate or non-targeted attack in response to the determination that the malicious security event is likely specifically targeting the organization; and at least one hardware processor that executes the detection module, the determination module, and the classification module.

11. The system of claim 10, wherein the determination module compares the malicious security event against the targeted-attack taxonomy by:

identifying a plurality of features of the malicious security event; and comparing the plurality of features of the malicious security event against the plurality of characteristics identified in the targeted-attack taxonomy.

12. The system of claim 10, further comprising weighting at least one of the characteristics identified in the targeted-attack taxonomy to increase or decrease the characteristic's influence in the calculation of the taxonomy score.

13. The system of claim 10, wherein the determination module determines that the malicious security event is likely targeting the organization by determining that each category score exceeds a corresponding threshold.

14. The system of claim 10, further comprising a taxonomy module that weights at least one category score to increase or decrease the category score's influence in the calculation of the taxonomy score.

15. The system of claim 10, further comprising a taxonomy module that:

collects security-related telemetry data from at least one security system;

identifies, within the security-related telemetry data, a plurality of characteristics indicative of targeted attacks; and creates the targeted-attack taxonomy from the plurality of characteristics indicative of targeted attacks.

16. A non-transitory computer-readable medium comprising one or more computer-executable instructions that, when executed by at least one processor of a computing device, cause the computing device to:

detect a malicious security event in connection with at least one organization;

compare the malicious security event against a targeted-attack taxonomy that comprises a plurality of categories, each category including a plurality of characteristics of targeted attacks;

determine, based at least in part on comparing the malicious security event against the targeted-attack taxonomy, that the malicious security event is likely specifically targeting the organization by:

calculating, based at least in part on comparing the malicious security event against the targeted-attack taxonomy, a category score for each category within the plurality of categories included in the targeted-attack taxonomy;

determining the number of features of the malicious security event that match corresponding characteristics identified in the targeted-attack taxonomy;

calculating, based at least in part on each category score and the number of features of the malicious security event that match corresponding characteristics identified in the targeted-attack taxonomy, a taxonomy score that represents the likelihood that the malicious security event is part of a targeted attack campaign as opposed to an indiscriminate or non-targeted attack; and determining that the taxonomy score exceeds a certain threshold; and in response to determining that the malicious security event is likely specifically targeting the organization, classify the malicious security event as part of a targeted attack campaign that is specifically targeting the organization instead of an indiscriminate or non-targeted attack.

* * * * *